(12) United States Patent
Myer et al.

(10) Patent No.: US 6,522,879 B2
(45) Date of Patent: *Feb. 18, 2003

(54) TWO-WAY TELEPHONE AND TWO-WAY PAGING SERVICE ON THE SAME WIRELESS INFRASTRUCTURE

(75) Inventors: Robert E. Myer, Denville, NJ (US); Jack C. Wen, Parsippany, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/602,894

(22) Filed: Feb. 16, 1996

(65) Prior Publication Data
US 2001/0044297 A1 Nov. 22, 2001

(51) Int. Cl.[7] .............................. H04Q 7/20; H04Q 7/00
(52) U.S. Cl. ...................... 455/426; 455/412; 455/445; 455/515; 340/7.21; 340/7.28; 340/7.29
(58) Field of Search ................................. 455/426, 458, 455/31.3, 38.1, 412, 413, 445, 466, 515, 517, 552, 553, 554, 555, 560, 561, 422; 340/328.44, 7.21, 7.28, 7.29

(56) References Cited

U.S. PATENT DOCUMENTS

| | | | |
|---|---|---|---|
| 4,654,867 A | | 3/1987 | Labedz et al. |
| 4,748,655 A | | 5/1988 | Thrower et al. |
| 5,109,401 A | * | 4/1992 | Hattori et al. ............... 455/407 |
| 5,117,449 A | | 5/1992 | Metroka et al. |
| 5,153,903 A | * | 10/1992 | Eastmond et al. .......... 455/458 |
| 5,175,758 A | | 12/1992 | Levanto et al. |
| 5,182,753 A | | 1/1993 | Dahlin et al. |
| 5,247,700 A | | 9/1993 | Wohl et al. |
| 5,311,570 A | * | 5/1994 | Grimes et al. ............. 455/31.1 |
| 5,329,578 A | | 7/1994 | Brennan et al. |
| 5,335,276 A | | 8/1994 | Thompson et al. |
| 5,390,362 A | * | 2/1995 | Modjeska et al. ......... 455/38.1 |
| 5,402,467 A | | 3/1995 | Watanabe |
| 5,404,391 A | | 4/1995 | Wavroch et al. |
| 5,406,620 A | | 4/1995 | Pei |
| 5,442,679 A | | 8/1995 | Regis et al. |
| 5,457,737 A | | 10/1995 | Wen |
| 5,459,458 A | | 10/1995 | Richardson et al. |
| 5,461,627 A | | 10/1995 | Rypinski |
| 5,502,761 A | * | 3/1996 | Duncan et al. ............. 455/412 |
| 5,574,771 A | * | 11/1996 | Driessen et al. ............ 455/413 |

OTHER PUBLICATIONS

Naik, Gautam, "Lowly Beeper May Finally Get Respect As Two-Way Paging Services Emerge," Wall Street Journal, Sep. 19, 1995, p. B1.

SkyTel, "Can Your Pager Do That?," Hemispheres, United Airline Magnize, Nov. 1995, p. 11.

* cited by examiner

Primary Examiner—Tracy Legree
(74) Attorney, Agent, or Firm—Orrick, Herrington & Sutcliffe, LLP (57) ABSTRACT

A wireless communication system or method capable of providing both a two-way telephone service and a two-way paging service on the same infrastructure. The system or method is capable of distinguishing whether a subscriber is a telephone or paging subscriber. If the subscriber is a two-way paging subscriber, the system or method allows the calling party to have the capability of conversing directly with the called party for a limited time or the options of leaving voice, numeric or alphanumeric messages for the called party to retrieve later.

42 Claims, 9 Drawing Sheets

TWO-WAY TELEPHONE AND TWO-WAY PAGING SERVICE ON THE SAME WIRELESS INFRASTRUCTURE

FIELD OF THE INVENTION

The present invention relates generally to improvements in the field of communication systems, and more particularly to a wireless communication system and method capable of providing an innovative two-way paging service.

BACKGROUND OF THE INVENTION

Both wireless paging services and wireless telephone services have gained popular acceptance over the years. One common advantage between the two services is that because they use a wireless medium, their subscribers gain greater mobility then the traditional wired communication services, such as the Plain Old Telephone Service or "POTS". On the other hand, the services differ in their respective communication capability and cost.

The one-way transmission capability of the traditional paging system is well-known in the art. A page subscriber typically carries a pager which is capable of receiving and displaying an incoming numeric or alphanumeric message. A person trying to reach the pager dials a telephone number corresponding to the pager. Upon hearing some prompting signal, the person will then enter, depending on the system capability, a numeric message using the touch-tone pad or speak a voice message to a service attendant. This message is then transmitted to the pager by the paging system. The message will typically contain the telephone number of where the person initiating the page can be reached within the next few minutes.

A major drawback of such a paging system is that it only provides a one-way communication. Therefore, upon receiving a page message on the pager, the paged person must use another communication device and service to reach the paging person. Since it is sometimes difficult for the paged person to get to a telephone to make a call back immediately, considerable telephone tag may result. In other words, situations occurs where two individuals periodically trying to contact one another and fail because the other person is unavailable.

While the use of wireless telephones with full two-way communication capability can alleviate much of the foregoing one-way limitation associated with paging devices, the cost of constructing a wireless telephone service is relatively expensive. In addition, the unlimited fully two-way communication capability of the wireless telephone may be more service than some potential paging subscribers either desire or are willing to pay for.

Furthermore, driven by the fact that many individuals, for a variety of reasons, subscribe to both services, attempts have been made to improve the integration of existing wireless telephone and paging services. A common way to meet this need has been to provide an end-user communication device that incorporates both the wireless telephone and paging circuities, while continuing to use a separate frequency spectrum and transmission equipment in the network for each service.

This approach, however, introduces yet other problems not encountered before. It is now known that due to the closeness of the two circuities in the end-user device, signal interference will occur if both services are active at the same time, resulting in degradation of both services. A common approach to resolving this problem has been to provide intelligent ways of communication between the paging equipment and the wireless telephone equipment so that one service knows when the other service is active and thereby refrains from transmitting, as disclosed in U.S. Pat. No. 5,153,903, issued to Eastmond et al.

The fundamental problem with the present integration methods discussed above is that basically two infrastructures are still used to provide both services. Each service is still required to have its own separate circuitry for the end-user equipment, separate frequency spectrum for transmission, and separate equipment in the network even though the equipments may work better in tandem than before. This duplication of resources prevents any significant amount of cost saving when both services are being provided by a single vendor.

From the discussion above, there is a need therefore for a communication system capable of providing a medium level of service to fill the gap between the expensive, fully two-way wireless telephone service and the inflexible, less expensive, one-way paging service without the use of redundant infrastructure.

SUMMARY OF THE INVENTION

The present invention is a wireless telephone communication system and method capable of providing both the traditional two-way telephone service and a new two-way paging service, requiring only some modification to the current wireless infrastructure. Therefore, both services can be provided using the same network equipment, frequency spectrum and end-user communication devices.

One preferred embodiment of the present invention comprises a wireless telephone communication system capable of providing both a two-way telephone service and a two-way paging service using wireless terminals, comprising:

one or more base stations each serving a region and the wireless terminals located within the region;

a wireless switch connected to each of the base stations for call delivery from a calling party to a called party's wireless terminal, said switch comprising means for distinguishing whether the called party is a two-way telephone subscriber or a two-way paging subscriber;

means for providing a two-way telephone communication indefinitely between the calling party and the called party until one of the parties hangs up, when the called party is a two-way telephone subscriber; and means for providing a two-way paging communication and determining if the length of the communication has exceeded a predetermined time period, when the called party is a two-way paging subscriber.

The above discussed features, as well as additional features and advantages of the present invention, will become apparent by reference to the following detailed description and accompanying drawings.

DETAILED DESCRIPTION

Figure 1:
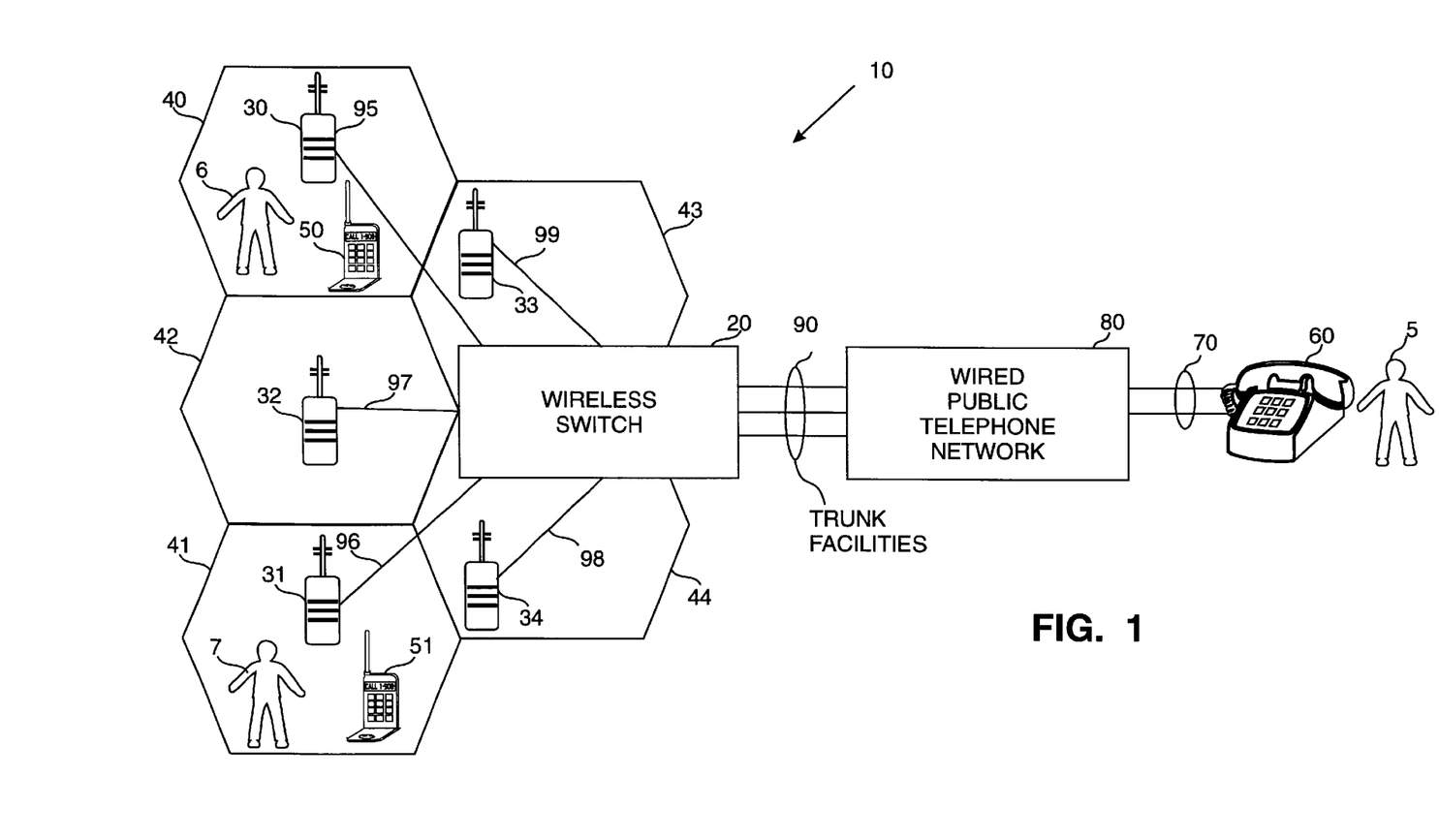
FIG. 1 is a system architectural diagram of a wireless paging system capable of providing both two-way telephone and two-way paging services according to the present invention.

FIG. 1 shows a preferred embodiment of the system architecture of a two-way wireless paging system according to the present invention. In the present preferred embodiment, the system architecture 10 comprises basically the same hardware components as an existing prior art wireless system with some hardware modifications and software enhancements as described in detail below. Other implementations of the two-way paging service according to the present invention may be employed using hardware- or software-only changes depending on the service provider's current wireless system and as desired by persons skilled in the art.

Therefore, according the present preferred embodiment, FIG. 1 shows a wireless system 10 having the same major system components of a standard (?) wireless system, comprising a regional wireless switch 20 and a plurality of base stations 30–34 connected to the wireless switch 20. The system 10 is divided into a plurality of transmission regions or cells 40–44. Consequently, this type of wireless system is also known as a cellular system. Each cell (e.g., cell 40) is served by a corresponding base station (e.g., base station 30).

A plurality of wireless telephones 50, 51 are typically dispersed through out the network and being served by the base station in the cell where the telephone is located. For example, the base station 30 is responsible for transmission of calls to and from the wireless telephone 50 residing within the cell 40 where the base station 30 is located. The wireless switch 20 handles the switching of the calls among the base stations and other functions as described in detail later in the specification.

The wireless system according to the present invention is capable of routing ordinary wireless telephone calls. The routing of a typical call from a caller using either a hard-wired telephone or a wireless telephone to another wireless telephone is well known in the art. Therefore, only a high-level summary of the call routing will be presented here.

As an example, if a caller 5 initiates a call from a hard-wired telephone 60 to a wireless telephone 50, the call travels from the telephone 60 through a pair of telephone lines 70 to the wired public telephone network 80. The wired public telephone network 80 will then route the call to the wireless switch 20 via trunk facilities 90 interconnecting the two networks. Once the call is routed to the wireless switch 20, the wireless switch first determines the cell where the dialed wireless telephone 50 resides, then routes the call to the base station 30 serving that cell 40 via trunk facility 95. The base station 30 will then attempt to complete the call to the wireless telephone 50.

On the other hand, if the caller initiates the call from another wireless telephone, for example, wireless telephone 51 instead, the call is routed directly to the wireless switch 20 via trunk facility 96, by the base station 31 serving the cell 41 where the originating wireless telephone 51 resides. Once the call is routed to the wireless switch 20, the same procedure outlined above is used to route the call to the called wireless telephone 50.

Figure 2:
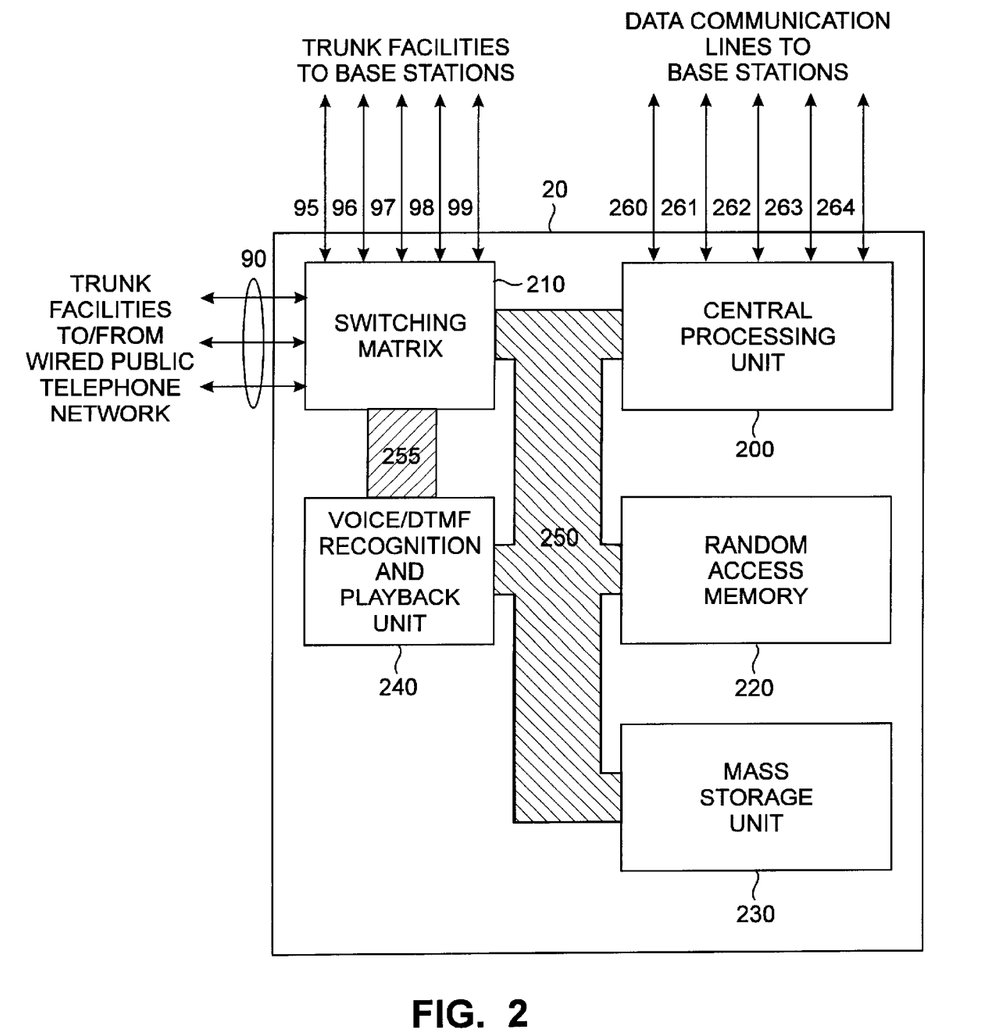
FIG. 2 is a functional block diagram showing an exemplary wireless switch which may be suitably employed in the present invention.

FIG. 2 shows an exemplary hardware system diagram of a wireless switch 20 suitable for use with the present invention. The representative hardware configuration depicted here is similar to many existing wireless switches well known in the art with some hardware modification, as detailed below. The wireless switch will execute a software program capable of providing both the existing two-way wireless telephone service and the new two-way paging service, also as detailed below.

The exemplary wireless switch as depicted in FIG. 2, comprises the following hardware components: a central processing unit 200; a switching matrix 210; a random access memory 220; a mass storage unit 230, and a voice/DTMF recognition and playback unit 240. A detailed explanation of each of the arrangements is set forth below.

As is well known in the art, the purpose of the central processing unit 200 is to control, coordinate and monitor the various, above-mentioned components 210–240 of the wireless switch 20. The central processing unit communicates with components 210–240 via a data bus 250. The central processing unit also communicates with and obtain information from the base stations 30–34 via one or more data communication lines 260–264 connected to each base station. Using the data communication lines 260–264, the central processing unit 200 can update the location of each wireless telephone within the wireless system 10, based on information obtained from the base stations 30–34.

The central processing unit 200 performs its function by executing a software computer program typically residing in the random access memory 220. The process of storing, loading and executing a computer program by a central processor unit and the interaction between a central processor and a random access memory are well known in the art and will not be described here.

As mentioned before, the present preferred embodiment of the system and method to provide both the two-way telephone and the two-way paging service on the same wireless infrastructure will require a software program 400 (see FIG. 4) to be executed by the central processing unit 200 of the exemplary wireless switch 20. The function of the exemplary software program 400 will be described in more detail later in the specification.

The switching matrix 210 selectively switches 1) calls between the wired public telephone network 80 and the wireless network 10, and 2) calls within the wireless network 10. As described previously and as is well known in the art, for example, if a call originates from a hard-wired telephone 60, it travels from the telephone 60 through a pair of telephone lines 70 to the wired public telephone network 80. The wired public telephone network 80 will then route the call to the wireless switch 20 via trunk facilities 90 interconnecting the two networks 10 and 80. The switch matrix 210 in wireless switch 20, under the control of the Central Processing Unit 200, accepts the call and then switches the call to the base station 30 serving that cell 40 via trunk facility 95 connecting the switching matrix 210 to the base station 30. The base station 30 will then attempt to complete the call to the called wireless telephone 50.

If instead, a call originates from another wireless telephone 51, the call will be directed by the base station 31 serving the calling wireless telephone 51 to the switching matrix 210 through the trunk facility 96 connecting the originating base station 31 to the switching matrix 210. The wireless switch 20 under the control of the Central Processing Unit 200 will then determine the location of the called wireless telephone 50 and route the call to the corresponding base station through the trunk facility 95 connecting the base station serving the called wireless telephone 50 and the switching matrix 210.

The mass storage unit 230 typically contains user subscription and billing information. In addition, the mass storage unit 230 in the present preferred embodiment is also used to store numeric, alphanumeric and voice page messages to be delivered by the wireless switch 20 to the paged party, as described later in the specification.

The voice/DTMF recognition & playback (VDRP) unit 240 is typically connected to the switching matrix 210, so that the switch 20 may connect selected calls to the unit 240 when needed. The functions of the VDRP unit include: 1) converting caller's voice phrases into textual messages so that the messages can be sent over the short message fields of the wireless communication channel and be displayed on the screen 51 of the wireless end-user device 50 (see FIG. 3), 2) detecting and decoding DTMF tones entered by calling parties, and 3) playing back specific page messages and general announcements stored in the mass storage unit 230 over the wireless communication channel.

The need to play a general announcement arises if, for example, the Central Processing Unit 200 determines that a called wireless telephone is busy and that a busy tone should be played to the caller. The switching matrix 210 will then switch the call to the VDRP unit 240, and the VDRP unit 240 will retrieve from the mass storage unit 230 the busy tone announcement and play the tone to the caller.

Another example of when a general announcement is played is when a called wireless telephone is out of the service area of the particular service provider. Again, the switching matrix 210 will switch the call to the VDRP unit 240 and the unit 240 will play an announcement such as "this subscriber is out of our service area, please try again later."

Figure 4:
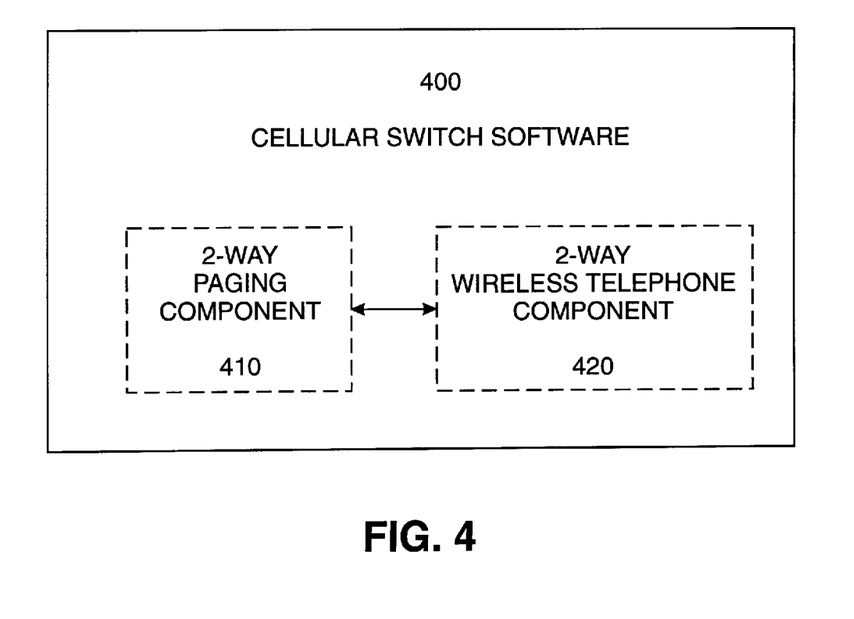
FIG. 4 is a structural diagram of an exemplary wireless switch software according to the present invention.

As mentioned above, in our preferred embodiment of the present invention, the VDRP unit 240 is also used to play the voice paging messages that have been stored in the wireless switch, as will be apparent when the function of the wireless switch software 400 is described later.

In addition, it would be obvious to persons skilled in the art that the stated functions of the VDRP unit in the preferred embodiment of our present invention may be implemented as separate discrete subunits rather then being combined together as in our illustration. In addition, the voice recognition function of the VDRP unit 240 may be substituted with human service agents which would transcribe a caller's voice message and translate them into the appropriate textual messages to be further processed by the system, as is commonly done in the existing one-way paging services.

Figure 3:
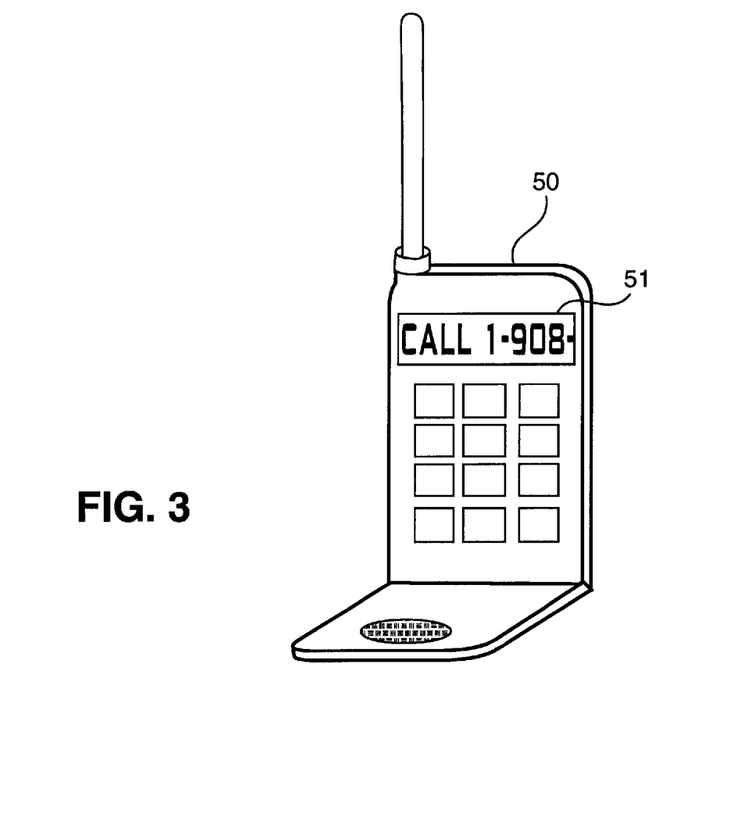
FIG. 3 illustrates an exemplary wireless communication end-user device which may be suitably used in the present invention.

FIG. 3 depicts an exemplary end-user wireless communication device 50 suitably used in the present invention. The preferred embodiment of the end-user device in our present invention is the same as an existing, regular wireless telephone conforming to the North American Advance Mobile Phone Standards (AMPS), as is well known in the art. Specifically, the wireless mobile telephone is capable of 1) transmitting and receiving voice messages on a regular wireless communication channel, and 2) transmitting and receiving numeric and alphanumeric messages on the short message fields of the wireless communication channel, and showing them on the display screen 51.

FIG. 4 depicts the structural diagram of an exemplary software 400 to be deployed in the wireless switch 20 for the present invention. As depicted, the software 400 has a component 410 for providing the regular two-way wireless telephone service and another component 420 for providing the two-way paging service. Of course, the two components 410 and 420 may share common subroutines or interact with each other, as illustrated in FIG. 4 and as described below.

The function of the software component 420 is the same as the software found in existing wireless switches well known in the art, and hence, will not be described in more detail here. On the other hand, the two-way paging component 410 will be described in more detail below.

Figure 5A:
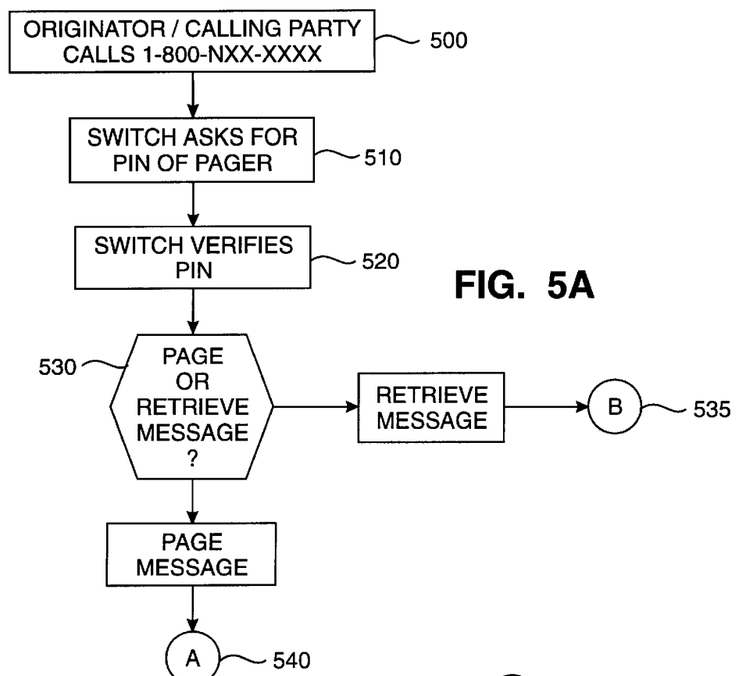
FIGS. 5A and 5B are flow charts showing exemplary ways of initiating the two-way paging service according to the present invention.
Figure 5B:
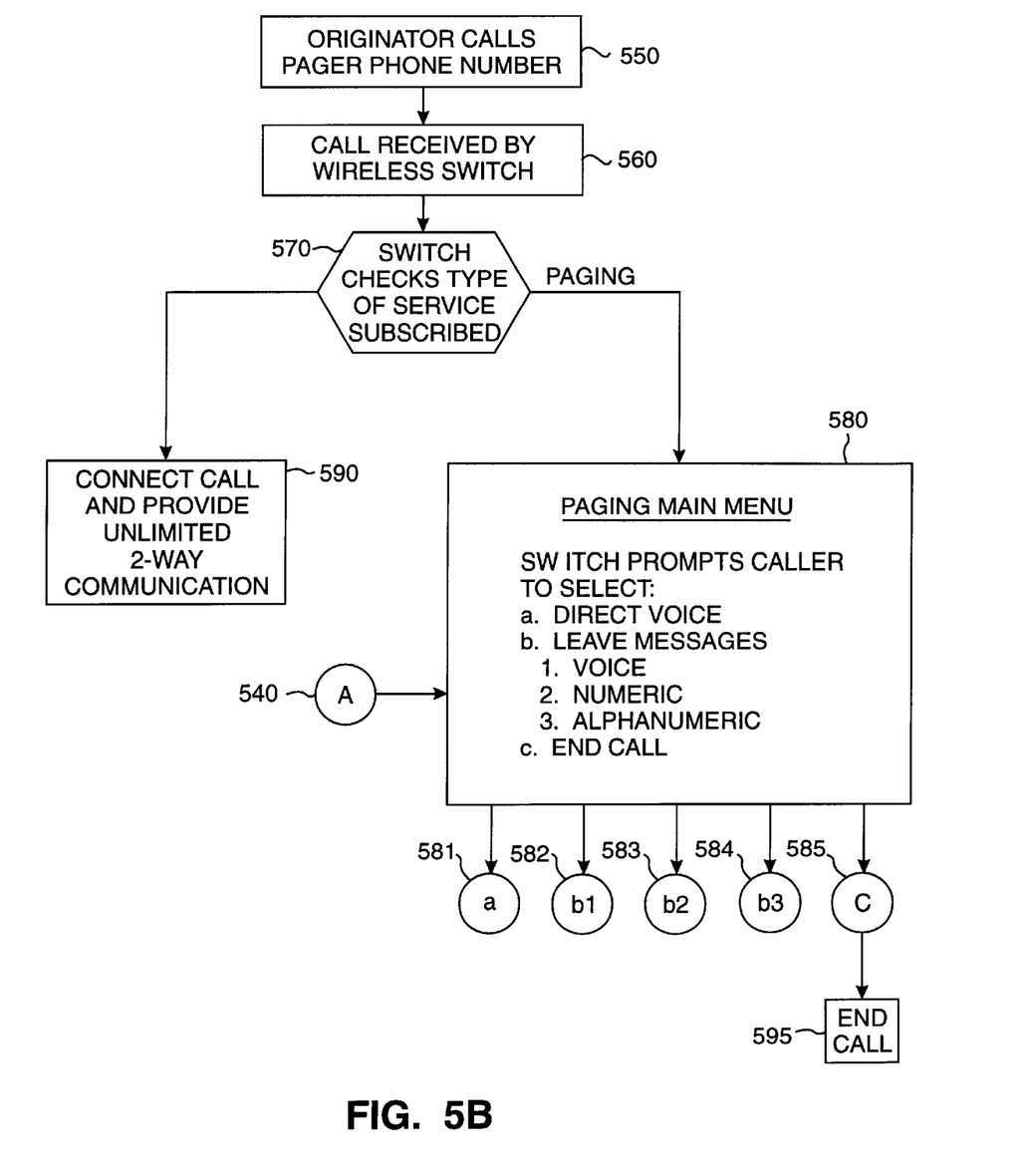

FIGS. 5A and 5B show two preferred embodiments of how a calling party or originator may originate the two-way paging service.

As illustrated in FIG. 5A, an originator or a calling party of the two-way paging service can initiate the service by dialing a common telephone number (e.g., 1-800-NXX-XXXX) to initiate a page, at step 500. The common number will be provisioned so that all calls to this number will terminate to the wireless switch 20 and preferably to the VDRP unit 240 of the wireless switch 20. The method required to accomplish this routing is similar to that described before and is well known in the art.

After the VDRP unit 240 terminates or answers the call, it will then prompt the calling party to enter the PIN number of the pager subscriber, at step 510. The switch 20 under the control of the Central Processing Unit 200 will then verify that the PIN is valid, at step 520. After the verification, the switch will further prompt the caller to select if the caller desires to 1) initiate a page message or 2) retrieve a page message, at step 530. For example, the VDRP may play an announcement such as "to initiate a page, press 1; to retrieve a message, press 2."

If the calling party selects the option of initiating a page, the switch will then play a "main menu" announcement for this service at branch A, step 540. If the calling party selects the option of retrieving a message, the switch will execute the branch B, step 535. The retrieving message option will be described in FIG. 10.

FIG. 5B illustrates another way to initiate the two-way paging service. An originator or a calling party will call a telephone number corresponding to either a two-way wireless telephone or a two-way pager as shown at step 550. The call will again be routed and terminated at the wireless switch 20, at step 560. The wireless switch 20 will check whether this telephone number corresponds to a two-way paging subscriber or a regular wireless telephone subscriber, as provided by the subscription information stored in the mass storage unit 230.

If the called telephone number corresponds to a wireless telephone with the regular wireless telephone service, the call will be connected to the wireless telephone in the same way as described before and as is well known in the art. The caller and the called party will be provided with unlimited two-way communication until either one of them hangs up, as is well known in the art, at step 590.

On the other hand, if the switch 20 determines that the called telephone number corresponds to a two-way pager, the switch 20 will play the "main menu" announcement to the caller, at step 580. The "main menu" announcement allows the originator to select the choice of a) having a direct voice communication with the called party; b1) leaving a voice message, b2) leaving a numeric message, b3) leaving an alphanumeric message; or c) ending the call.

Figure 6:
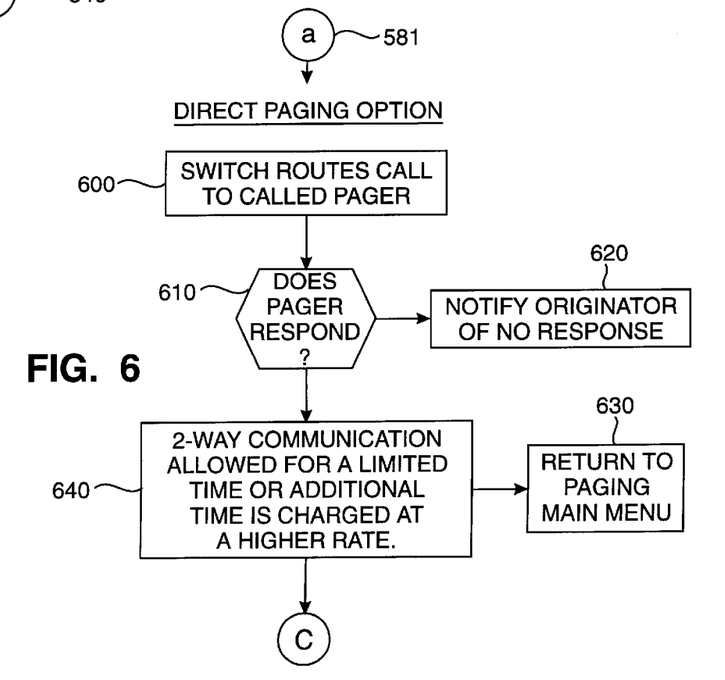
FIG. 6 is a flow chart showing the steps the system performs if a caller selects the option of paging directly.

FIG. 6 shows the call flow if the calling party chooses the option "a" of talking to the called party directly and instantaneously. In this case, the switch 20 will attempt to complete the call to the called pager instantaneously, at step 600. The routing of the call will be the same as that described previously for a regular two-way telephone call and is well known in the art. If the pager does not answer after a predetermined period or a certain number rings, the switch 20 will first play an announcement to the calling party that the pager did not answer and will connect the calling party back to the main menu announcement, at steps 610–630.

If on the other hand, the pager answers the call, the switch 20 will begin timing the call and allow full 2-way communication to last for a predetermined, limited time period, at step 640. In the present preferred embodiment, the switch 20 may either terminate the call after such a time period or start charging the pager subscriber at a higher rate, at step 640.

Figure 7:
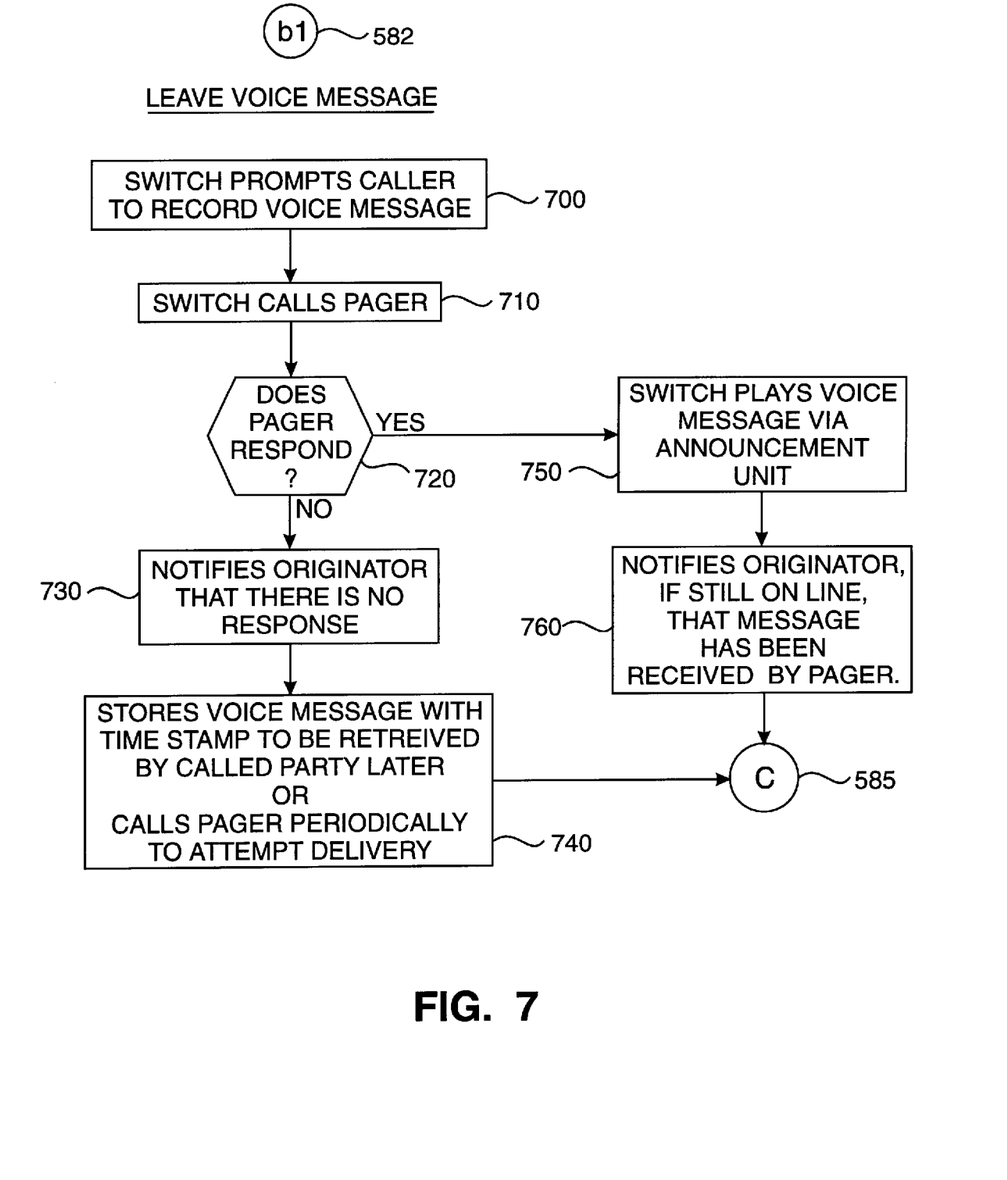
FIG. 7 is a flow chart showing the steps the system performs if a caller selects the option of leaving a voice mail message to be retrieved by a called party.

FIG. 7 illustrates the call flow when the calling party chooses option b1 of leaving a voice page message for retrieval by the page subscriber. In this case, the switch 20 will first prompt the calling party to record the voice message, at step 700. In our preferred embodiment, the message will be digitized and stored in the mass storage unit 230 for playback by the VDRP unit 240. The switch then attempts to call the pager, at step 710. If the pager answers, the switch 20 and in particular the VDRP unit 240, will play the stored voice message to the pager using the wireless communication voice channel, at step 750. After playing the voice message, the switch 20 will notify the caller that the voice message has been delivered, if the caller is still on the line, at step 760.

If, on the other hand, the pager does not answer at step 720, the switch will first notify the originator that there is no response, at step 730. The switch 20 will then either store the voice message in the mass storage unit 230 to be retrieved by the called party later, or periodically attempt to call the pager to deliver the message, at step 740.

Figure 8:
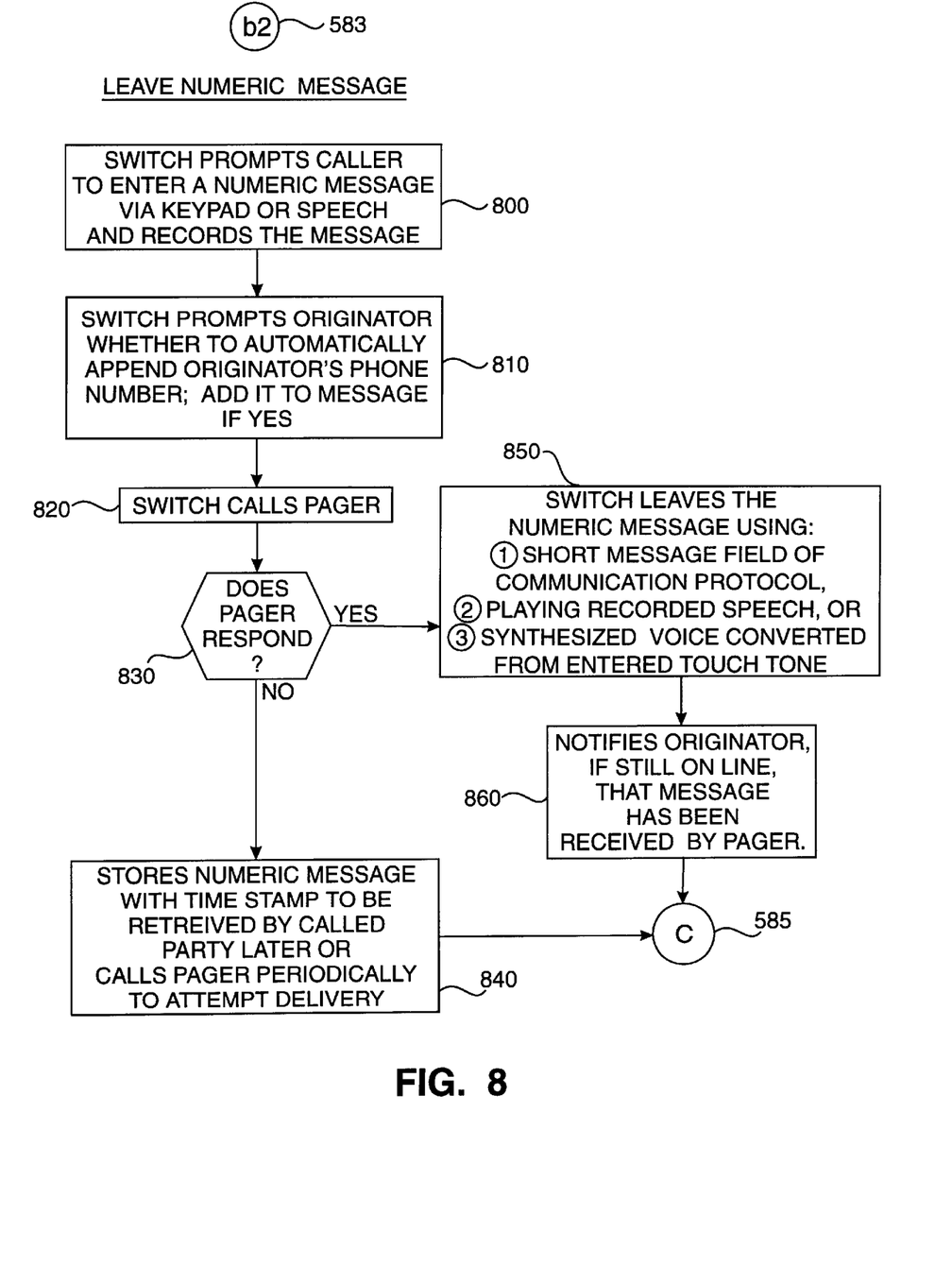
FIG. 8 is a flow chart showing the steps the system performs if a caller selects the option of leaving a numeric message to be retrieved by a called party.

FIG. 8 illustrates the call flow when the calling party chooses option b2 of leaving a numeric page message for retrieval by the page subscriber. In this case, switch 20 will first prompt the calling party to enter a numeric message either using the calling party's telephone touch-tone keypad or by speaking the numeric message into his or her handset, at step 800. The switch 20 will further prompt the caller to select whether the caller wishes to forward his or her originating telephone number automatically with the just recorded numeric message, at step 810. If the originator chooses yes to this option, the originating telephone number will be automatically appended to the message sent. The switch may obtain the originating telephone number automatically, for example, by using the Automatic Numbering Identification (ANI) scheme well known and widely used in the North American Public telephone network.

Thereafter, the switch 20 will attempt to call the pager, at step 820. If the pager answers, the switch 20 will relay the numeric message using one of the different options possible, at step 850. At step 850, the switch 20 can transmit the message to the pager as either 1) a textual message to be shown on the display screen 51 of the wireless telephone 50 using the short message field of the cellular communication channel, 2) a voice numeric message as recorded by the originator's voice, if the message was so recorded, using the regular voice communication channel, or 3) a voice numeric message in a synthesized voice, if the message was entered using touch tones but has been converted to synthesized voice by the VDRP unit, also using the regular voice communication channel. After successfully playing the voice message, the switch will notify the caller that the message has been delivered, if the caller is still on the line, at Step 860.

If the pager does not respond as shown at step 830, the switch will store the numeric message in the mass storage unit 230 with a time stamp of when the message is originally recorded in order to be retrieved later by the called party. In the alternative, the switch 20 may periodically call the pager to see if the pager will answer, at step 840.

Figure 9:
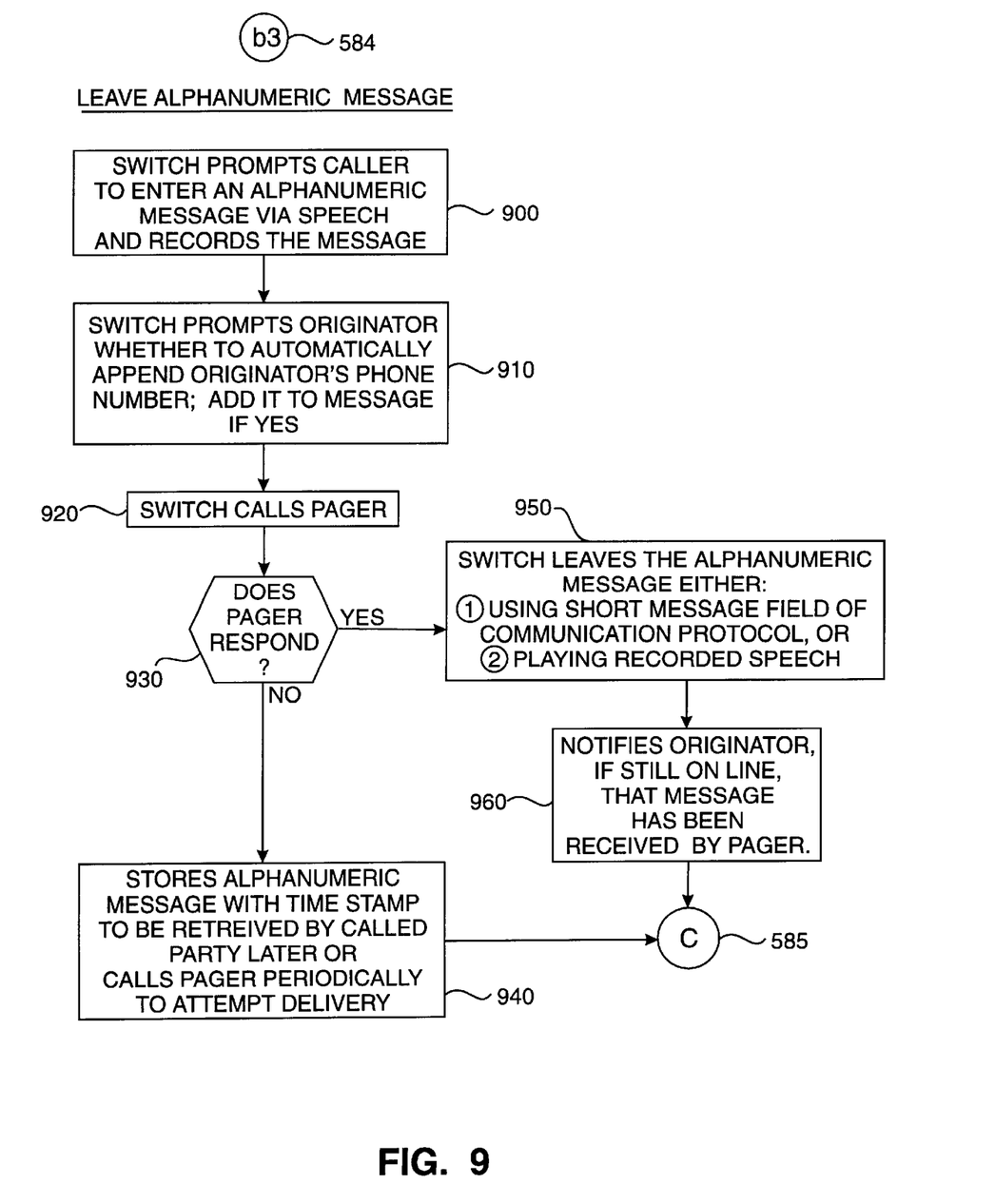
FIG. 9 is a flow chart showing the steps the system performs if the caller selects the option of leaving an alphanumeric message to be retrieved by a called party.

FIG. 9 shows the option of when the originator selects the option of leaving an alphanumeric message. In this case, the call flow is similar to that of leaving a numeric message as shown in FIG. 8. The caller can leave an alphanumeric message by speaking into his or her telephone handset, at step 900. This speech may either be recorded by the VDRP unit 240 in the switch 20, or further converted into textual alphanumeric message by the unit 240. Steps 910 to 940 are similar to steps 810 to 840 for the numeric paging option described in FIG. 8. At step 950, once the pager answers, the switch can deliver the alphanumeric message as either 1) a textual message transmitted in the short message file of the wireless communication protocol, if the caller's speech has been translated into textual message by the VDRP unit 240, or 2) a voice alphanumeric message as recorded by VDRP unit 240, using the regular voice wireless communication channel at step 1040.

Figure 10:
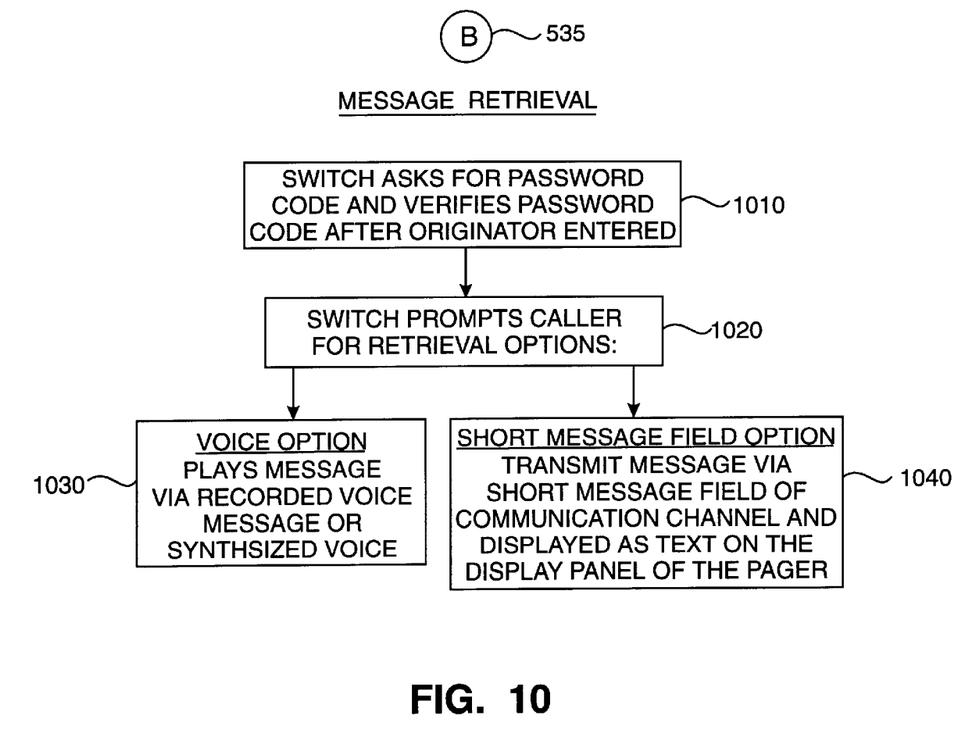
FIG. 10 is a flow chart showing the steps the system performs when a two-way paging subscriber chooses to retrieve a page message.

FIG. 10 in conjunction with FIG. 5A illustrate how a page subscriber may retrieve a page message whether the message is a voice, numeric or alphanumeric message. As illustrated in FIG. 5A and described before, the present preferred embodiment is for a page subscriber to call a specific telephone number to retrieve a message. The switch 20 then asks for and verifies the PIN entered by the caller, at steps 510 and 520. The switch then prompts the caller to select whether to retrieve or to page messages, at 530. If the caller selects to retrieve messages, the switch will further asks the caller to enter a password and verifies the password after the caller has entered it, at step 1010 in FIG. 10. After the verification of the password, the switch prompts the caller to select a retrieval option, at step 1020. The caller may elect to retrieve a message via the voice option, transmitting a voice message over the regular wireless voice channel, at step 1030; or via the text option, transmitting a text message using the short message field of the wireless communication channel.

It is to be understood that the embodiments and variations shown and described herein are illustrative only and that various modifications may be implemented by those skilled in the art without departing from the scope and spirit of the invention.

We claim:

1. A wireless communication system conforming to the North American Advance Mobile Phone Standards (AMPS) providing both a two-way telephone service and a two-way paging service using the same transmission and reception equipment and the same communication channel at a single transmission rate, comprising:

one or more AMPS base stations, each serving a region and wireless telephones located within the region;

a wireless switch connected to each of the AMPS base stations for call delivery from a calling party to a called party's AMPS wireless telephone, said wireless switch comprising means for distinguishing whether the called party is a two-way telephone subscriber or a two-way paging subscriber;

means for providing a two-way telephone communication indefinitely between the calling party and the called party until one of the parties hangs up, when the called party is a two-way telephone subscriber; said two-way telephone communication means in an AMPS wireless communication system including a message field; and means for providing a two-way paging communication; wherein the means for two-way paging communication is implemented using the AMPS message field present in the means for providing two-way telephone communication.

2. The system of claim 1 wherein the switch further comprises means for terminating the two-way voice communication when the two-way voice communication has exceeded the predetermined time period.

3. The system of claim 1 wherein the switch further comprises means for charging the two-way paging subscriber at a higher rate when the two-way voice communication has exceeded the predetermined time period.

4. A wireless communication system conforming to the North American Advance Mobile Phone Standards (AMPS) providing both a two-way telephone service and a two-way paging service using the same transmission and reception equipment and the same communication channel at a single transmission rate, comprising:

one or more AMPS base stations, each serving a region and the wireless telephones located within the region;

a wireless switch connected to each of the AMPS base stations for call delivery from a calling party to a called party's AMPS wireless telephone, the wireless switch comprising means for distinguishing whether the called party is a two-way telephone subscriber or a two-way paging subscriber;

means for providing two-way paging communication, including means for recording and storing a message for later delivery to the called wireless telephone, when the called party is a two-way paging subscriber; and means for providing a two-way telephone communication indefinitely between the calling party and the called party until one of the parties hangs up, when the called party is a two-way telephone subscriber; said two-way telephone communication means in an AMPS wireless communication system including a message field wherein the means for providing two-way paging communication is implemented using the AMPS message field present in the means for providing two-way telephone communication.

5. A wireless communication system conforming to the North American Advance Mobile Phone Standards (AMPS) providing both a two-way telephone service and a two-way paging service using the same transmission and reception equipment and the same communication channel at a single transmission rate, comprising:

one or more AMPS base stations, each serving a region and the wireless telephones located within the region;

a wireless switch connected to each of the AMPS base stations for call delivery from a calling party to a called party's AMPS wireless telephone, said switch comprising means for distinguishing whether the called party is a two-way telephone subscriber or a two-way paging subscriber;

means for providing the two-way paging communication, including means for allowing the calling party, when the called party is a two-way paging subscriber, the capability to choose the option of a) having a direct, instantaneous voice communication with the called party or b) leaving a message to be retrieved by the called party; and means for providing a two-way telephone communication indefinitely between the calling party and the called party until one of the parties hangs up, when the called party is a two-way telephone subscriber; said two-way communication means in an AMPS wireless communication system including a message field wherein the means for providing two-way paging communication is implemented using the AMPS message field present in the means for providing two-way telephone communication.

6. The system of claim 5 wherein the means for allowing the calling party to leave a message when the called party is a two-way paging subscriber further comprises means for allowing the calling party to choose the option of b1) leaving a voice message, to be retrieved by the called party, b2) leaving a numeric message, to be retrieved by the called party, and b3) leaving an alphanumeric message, to be retrieved by the called party.

7. The system of claim 6 wherein the switch further comprises means for providing a two-way voice communication and determining if the length of the communication has exceeded a predetermined time period, when the called party is a two-way paging subscriber and when the calling party has selected the option of having a direct, instantaneous voice communication with the called party.

8. The system of claim 7 wherein the switch further comprises means for terminating the two-way voice communication when the two-way voice communication has exceeded the predetermined time period.

9. The system of claim 7 wherein the switch further comprises means for charging the two-way paging subscriber at a higher rate when the two-way voice communication has exceeded the predetermined time period.

10. The system of claim 6 wherein the switch further comprises:

means for recording a voice page message when the caller chooses the option of leaving a voice message; and means for playing the recorded message to the called party, when the called wireless telephone answers in response to the switch's call delivery.

11. The system of claim 10 wherein the switch further comprises means for storing the recorded voice message to be retrieved by the called party later, when the called wireless telephone does not answer in response to the switch's call delivery.

12. The system of claim 11 wherein the storing means further comprises means for appending to the message a time stamp of when the message was recorded.

13. The system of claim 10 wherein the switch further comprises:

means for storing the recorded voice message when the called wireless telephone does not respond to the switch's call delivery; and means for calling the called wireless telephone periodically, in order to deliver the recorded message when the called wireless telephone answers.

14. The system of claim 13 wherein the storing means further comprises means for appending to the message a time stamp of when the message was recorded.

15. The system of claim 6 wherein the switch further comprises:
   means for prompting the caller to enter a numeric message using the calling party's telephone keypad when the caller selects the option of leaving a numeric message;
   means for recording the numeric message entered by the calling party; and
   means for delivering the numeric message to the called telephone.

16. The system of claim 6 wherein the switch further comprises:
   means for prompting the caller to enter a numeric message using the calling party's speech when the caller selects the option of leaving a numeric message;
   means for recording the numeric message spoken; and
   means for playing back the recorded numeric message when the called telephone answers.

17. The system of claim 16 wherein the switch further comprises:
   means for allowing the calling party to automatically append the calling party's telephone number in the numeric message; and
   means for notifying the calling party, if the calling party is still on line, that the numeric message has been received by the called party.

18. The system of claim 6 wherein the switch further comprises:
   means for prompting the caller to enter a numeric message using the calling party's touchtone telephone keypad when the caller select the option of leaving a numeric message;
   means for recording the numeric message entered;
   means for converting the touchtone numeric message into a synthesized voice message; and
   means for playing back the synthesized message when the called telephone answers.

19. A method of providing both a two-way telephone service and a two-way paging service using the same transmission and reception equipment and the same communication channel as a single transmission rate in a wireless communication system conforming to the North American Advance Mobile Phone Standards (AMPS), comprising the steps of:
   distinguishing whether a called party is a two-way telephone subscriber or a two-way paging subscriber;
   providing a two-way telephone communication indefinitely between a calling party and the called party until one of the parties hangs up, when the called party is a two-way telephone subscriber; said two-way telephone communication in an AMPS wireless communication system including a message field; and
   providing a two-way paging communication, wherein the two-way paging communication is implemented using the AMPS message field present in the two-way telephone communication.

20. The method of claim 19 further comprises the step of terminating the two-way voice communication when the two-way voice communication has exceeded the predetermined time period.

21. The method of claim 19 further comprising the step of charging the two-way paging subscriber at a higher rate when the two-way voice communication has exceeded the predetermined time period.

22. A method of providing both a two-way telephone service and a two-way paging service using the same transmission and reception equipment and the same communication channel at a single transmission rate in a wireless communication system conforming to the North American Advance Mobile Phone Standards (AMPS), comprising the steps of:
   distinguishing whether a called party is a two-way telephone subscriber or a two-way paging subscriber;
   providing two-way paging communication, including recording and storing a message for later delivery to the called party's wireless telephone, when the called party is a two-way paging subscriber; and
   providing a two-way telephone communication indefinitely between the calling party and the called party until one of the parties hangs up, when the called party is a two-way telephone subscriber; said two-way telephone communication in an AMPS wireless communication system including a message field, wherein the two-way paging communication is implemented using the AMPS message field present in the two-way telephone communication.

23. A method of providing both a two-way telephone service and a two-way paging service using the same transmission and reception equipment and the same communication channel at a single transmission rate in a wireless communication system conforming to the North American Advance Mobile Phone Standards (AMPS), comprising the steps of:
   distinguishing whether a called party is a two-way telephone subscriber or a two-way paging subscriber;
   providing two-way paging communication, including allowing a calling party, when the called party is a two-way paging subscriber, the capability to choose the option of a) having a direct, instantaneous voice communication with the called party or b) leaving a message to be retrieved by the called party; and
   providing a two-way telephone communication indefinitely between the calling party and the called party until one of the parties hangs up, when the called party is a two-way telephone subscriber; said two-way telephone communication in an AMPS wireless communication system including a message field wherein the two-way paging communication is implemented using the AMPS message field present in the two-way telephone communication.

24. The method of claim 23 wherein the step of allowing the calling party to leave a message when the called party is a two-way paging subscriber further comprising the step of allowing the calling party to choose the option of b1) leaving a voice message, to be retrieved by the called party, b2) leaving a numeric message, to be retrieved by the called party, and b3) leaving an alphanumeric message, to be retrieved by the called party.

25. The method of claim 24 further comprising the steps of:
   recording a voice page message when the caller chooses the option of leaving a voice message; and
   playing the recorded message to the called party, when the called telephone answers in response to the switch's call delivery.

26. The method of claim 25 further comprising the step of storing the recorded voice message to be retrieved by the called party later, when the called telephone does not answer in response to the switch's call delivery.

27. The method of claim 26 wherein the storing step further comprises the step of appending to the message a time stamp of when the message was recorded.

28. The method of claim 25 further comprising the steps of:
storing the recorded voice message when the called telephone does not respond to the switch's call delivery; and
calling the called telephone periodically, in order to delivery the recorded message when the called telephone answers.

29. The method of claim 28 wherein the storing step further comprises the step of appending to the message a time stamp of when the message was recorded.

30. The method of claim 29 further comprising the steps of:
prompting the caller to enter a numeric message using the calling party's telephone keypad when the caller select the option of leaving a numeric message;
recording the numeric message entered by the calling party; and
delivering the numeric message to the called telephone.

31. The method of claim 24 further comprising the steps of:
prompting the caller to enter a numeric message using the calling party's speech when the caller select the option of leaving a numeric message;
recording the numeric message spoken; and
playing back the recorded numeric message when the called telephone answers.

32. The method of claim 31 further comprising the step of:
allowing the calling party to automatically append the calling party's telephone number in the numeric message; and
notifying the calling party, if the calling party is still on line, that the numeric message has been received by the called party.

33. The method of claim 24 further comprising the steps of:
prompting the caller to enter a numeric message using the calling party's touchtone telephone keypad when the caller select the option of leaving a numeric message;
recording the numeric message entered;
converting the touchtone numeric message into a synthesized voice message; and
playing back the synthesized message when the called cellular telephone answers.

34. The method of claim 23 further comprising the step of providing a two-way voice communication and determining if the length of the communication has exceeded a predetermined time period, when the called party is a two-way paging subscriber and when the calling party has selected the option of having a direct, instantaneous voice communication with the called party.

35. The method of claim 34 further comprising the step of terminating the two-way voice communication when the two-way voice communication has exceeded the predetermined time period.

36. The method of claim 34 further comprising the step of charging the two-way paging subscriber at a higher rate when the two-way voice communication has exceeded the predetermined time period.

37. A switch capable of providing both a two-way telephone service and a two-way paging service using the same transmission and reception equipment and the same communication channel as a single transmission rate in a wireless communication system conforming to the North American Advance Mobile Phone Standards (AMPS), comprising:
means for distinguishing whether a called party is a two-way telephone subscriber or a two-way paging subscriber;
means for providing a two-way telephone communication indefinitely between a calling party and the called party until one of the parties hangs up, when the called party is a two-way telephone subscriber; said two-way telephone communication means in an AMPS wireless communication system including a message field; and
means for providing a two-way paging communication when the called party is a two-way paging subscriber; wherein the means for two-way paging communication is implemented using the AMPS message field present in the means for two-way telephone communication.

38. The switch of claim 37 further comprising means for terminating the two-way voice communication when the two-way voice communication has exceeded the predetermined time period.

39. The switch of claim 37 further comprising means for charging the two-way paging subscriber at a higher rate when the two-way voice communication has exceeded the predetermined time period.

40. A switch capable of providing both a two-way telephone service and a two-way paging service using the same transmission and reception equipment and the same communication channel at a single transmission rate in a wireless communication system conforming to the North American Advance Mobile Phone Standards (AMPS), comprising:
means for distinguishing whether a called party is a two-way telephone subscriber or a two-way paging subscriber;
means for providing two-way paging communication including means for recording and storing a message for later delivery to the called telephone, when the called party is a two-way paging subscriber; and
means for providing a two-way telephone communication indefinitely between a calling party and the called party until one of the parties hangs up, when the called party is a two-way telephone subscriber; said two-way telephone communication means in a n AMPS wireless communication system including a message field wherein the means for providing two-way paging communication is implemented using the AMPS message field present in the means for providing two-way telephone communication.

41. A switch capable of providing both a two-way telephone service and a two-way paging service using the same transmission and reception equipment and the same communication channel at a single transmission rate in a wireless communication system conforming to the North American Advance Mobile Phone Standards (AMPS), comprising:
means for distinguishing whether a called party is a two-way telephone subscriber or a two-way telephone subscriber or a two-way paging subscriber;
means for providing two-way paging communication including means for allowing a calling party, when the called party is a two-way paging subscriber, the capability to choose the option of a) having a direct, instantaneous voice communication with the called party or b) leaving a message to be retrieved by the called party; and means for providing a two-way telephone communication indefinitely between the calling party and the called party until one of the parties hangs up, when the called party is a two-way telephone subscriber; said two-way communication means in an AMPS wireless communication system including a message field wherein the means for providing two-way paging communication is implemented using the AMPS message field present in the means for providing two-way telephone communication.

42. The switch of claim 41 wherein the means for allowing the calling party to leave a message when the called party is a two-way paging subscriber further comprises means for allowing the calling party to choose the option of b1) leaving a voice message, to be retrieved by the called party, b2) leaving a numeric message, to be retrieved by the called party, and b3) leaving an alphanumeric message, to be retrieved by the called party.

* * * * *